US008461736B2

(12) United States Patent
Bruno et al.

(10) Patent No.: US 8,461,736 B2
(45) Date of Patent: Jun. 11, 2013

(54) ELECTRIC MOTOR FOR OPERATING A SHUTTER ELEMENT OR SOLAR PROTECTION ELEMENT IN A BUILDING

(75) Inventors: Serge Bruno, Marnaz (FR); Pierre-Emmanuel Cavarec, Mont Saxonnex (FR)

(73) Assignee: Somfy SAS, Cluses (FR)

( * ) Notice: Subject to any disclaimer, the term of this patent is extended or adjusted under 35 U.S.C. 154(b) by 75 days.

(21) Appl. No.: 12/809,955

(22) PCT Filed: Dec. 23, 2008

(86) PCT No.: PCT/IB2008/055503
§ 371 (c)(1),
(2), (4) Date: Jun. 21, 2010

(87) PCT Pub. No.: WO2009/083898
PCT Pub. Date: Jul. 9, 2009

(65) Prior Publication Data
US 2010/0270893 A1 Oct. 28, 2010

(30) Foreign Application Priority Data
Dec. 28, 2007 (FR) ...................... 07 09174

(51) Int. Cl.
*H02K 19/38* (2006.01)
*H02K 11/00* (2006.01)
*H02K 1/06* (2006.01)
*H02K 21/12* (2006.01)

(52) U.S. Cl.
USPC ............. 310/112; 310/68 B; 310/216.022; 310/156.28

(58) Field of Classification Search
USPC ........... 310/216, 216.022, 216.025–216.039, 310/216.096–216.099, 195, 112, 114, 179, 310/194
See application file for complete search history.

(56) References Cited

U.S. PATENT DOCUMENTS

| 2,487,688 A | * | 11/1949 | Bishofberger | 310/112 |
| 4,115,715 A | | 9/1978 | Muller | |
| 4,168,459 A | * | 9/1979 | Roesel, Jr. | 310/112 |
| 4,549,104 A | | 10/1985 | Niimura et al. | |
| 4,883,997 A | * | 11/1989 | De Cesare | 310/179 |
| 5,275,141 A | * | 1/1994 | Tsunoda et al. | 123/399 |
| 5,365,137 A | | 11/1994 | Richardson et al. | |
| 5,646,466 A | * | 7/1997 | Noji et al. | 310/112 |

(Continued)

FOREIGN PATENT DOCUMENTS

| DE | 3302529 A | 7/1984 |
| DE | 19852930 A | 5/2000 |
| FR | 2685355 A | 6/1993 |
| JP | 60-121955 A | 6/1985 |

(Continued)

*Primary Examiner* — Tran N. Nguyen
*Assistant Examiner* — Thomas Truong
(74) *Attorney, Agent, or Firm* — Frommer Lawrence & Haug LLP; Ronald R Santucci

(57) ABSTRACT

An electric motor (100) for operating a shutter or solar protection element in a building, comprising at least two phases (10; 20; 30; 50; 60) and a magnetized rotor (16; 40; 70) common to both phases, each phase being relative to a rotor portion (41, 42; 71; 72) in the direction of the axis of the rotor and comprising two windings (14, 15), wherein each phase comprises an insulating yoke frame (13) on which the two windings are produced and which has a central portion (131) separating the windings, the central portion being provided with a first through-recess (134) able to surround a rotor portion passing through the phase.

12 Claims, 2 Drawing Sheets

U.S. PATENT DOCUMENTS

| | | | |
|---|---|---|---|
| 5,708,406 A * | 1/1998 | Tsunoda et al. | 335/272 |
| 5,955,812 A * | 9/1999 | Warner | 310/233 |
| 6,105,630 A | 8/2000 | Braun et al. | |
| 6,237,213 B1 | 5/2001 | Braun et al. | |
| 6,710,491 B2 | 3/2004 | Wu et al. | |
| 2003/0080639 A1 | 5/2003 | Wu et al. | |

FOREIGN PATENT DOCUMENTS

| | | |
|---|---|---|
| JP | 9-247911 A | 9/1997 |
| JP | 9-247913 A | 9/1997 |
| WO | WO 2004/022901 A | 3/2004 |
| WO | WO 2007/133499 A | 11/2007 |

* cited by examiner the sensor or the sensors responsible for accurately determining the position of the rotor in order to switch the current in the phase windings.

It seems logical to have such a sensor in the immediate vicinity of the magnetized rotor, if the sensor is sensitive to the magnetic field. However, this arrangement makes the sensor also sensitive to the magnetic armature reaction, that is to say to the magnetic field created by the windings. The result of this is that the indication from the sensor does not reflect the angular position of the rotor. Machines with electronic switching therefore require the sensor to be magnetically shielded, for example as described in the patent applications JP 60121955 or FR 2 685 355, thereby making the machine complex. For a motor with external magnetized rotor, the U.S. Pat. No. 4,549,104 describes such shielding. It is also possible to provide a separate magnetic circuit that concentrates the rotor flux toward the sensor, as described in the U.S. Pat. No. 4,115,715. All these solutions are complex. Another known solution is to remotely situate the rotor position detection function outside the active part of the machine, by using, for example, an optical sensor as in the U.S. Pat. No. 6,105,630. This further increases the length of the motor, and is therefore to the detriment of its volume.

ELECTRIC MOTOR FOR OPERATING A SHUTTER ELEMENT OR SOLAR PROTECTION ELEMENT IN A BUILDING

This application is a 371 of PCT/IB2008/055503 filed on Dec. 23, 2008, published on Jul. 9, 2009 under publication number WO 2009/083898, which claims priority benefits from French Patent Application Number 07 09174 filed Dec. 28, 2007, the disclosure of which is incorporated herein by reference.

BACKGROUND OF THE INVENTION

The invention relates to the field of synchronous electric motors with low-power electronic switching intended to drive shutter or solar protection elements in buildings.

Such motors need to offer a high torque with a low volume, enabling them to be incorporated in a box of substantially rectangular section, for example a Venetian blind rail.

These particular dimensions mean that long motors have to be produced, the length of the motor compensating for its small section in order to obtain the power needed to drive the shutter or solar protection element.

DESCRIPTION OF THE PRIOR ART

In the weaving industry, it is known practice to produce long synchronous motors, as described in the U.S. Pat. No. 6,105,630 or U.S. Pat. No. 6,237,213. Significant space is provided therein for the windings of each phase, while the rotor is a long cylinder, covered in the axial direction by the first phase, then by the second. A similar arrangement can be found in the patent application JP 61-167360. This arrangement is very different from the usual arrangement of a rotary motor with magnetized rotor, for which each phase covers only one angular portion of the rotor. In the cases mentioned, the rotor comprises two magnetized segments: a first magnetized segment is arranged in the cylinder part covered by the first phase, while a second magnetized segment is arranged in the cylinder part covered by the second phase. The two magnetizations are perpendicular. They are offset by 120° if the motor has 3 phases.

One advantage of these devices is their very low inertia, due to the very small diameter of the rotor.

However, their drawback is that they are difficult to produce, as illustrated by the U.S. Pat. No. 6,237,213, and they have a completely eccentric rotor, which is not suitable for the applications targeted by the present invention.

Patent application JP 9-247911 also describes a modular structure in several successive phases along one and the same rotor. This structure has the advantage of being centered. However, the motor is a variable reluctance motor, and the magnetic poles of the stator consequently have a very small size relative to the diameter of the rotor. The result of this is that the internal space available in a phase in the absence of the rotor is very great, making it possible, for example, to separately insert the two windings relative to one and the same phase, each of the windings being able to be produced on a separate yoke frame, which is not possible in the case of a small diameter magnetized motor.

The same applies for the patent application JP 9-247913, which also has the drawback of windings that extend outside the magnetic circuit, therefore increasing the volume of the motor.

Another problem raised by the production of motors with magnetized rotor and with electronic switching is the position

SUMMARY OF THE INVENTION

The aim of the invention is to provide an electric motor that overcomes these drawbacks and that improves the motors that are known from the prior art. In particular, the electric motor according to the invention makes it possible to obtain significant power for a given volume, to obtain a rotor that is centered in the structure of the motor and to position a rotor position sensor that is largely insensitive to the magnetic field created by the windings.

The electric motor according to the invention is defined by claim 1.

Various embodiments are defined by the dependent claims 2 to 12.

DESCRIPTION OF THE DRAWINGS

The appended drawing shows, by way of example, one embodiment of a motor according to the invention.

DESCRIPTION OF THE PREFERRED EMBODIMENTS

Figure 1:
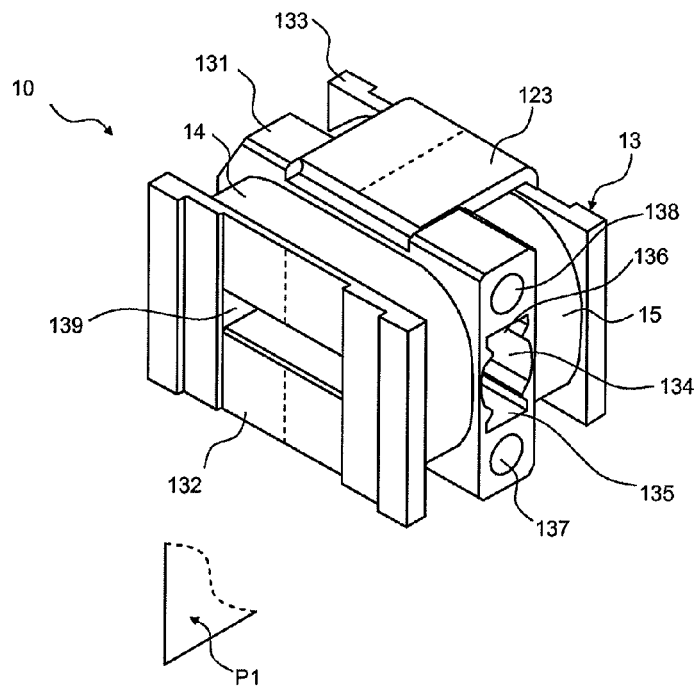
FIG. 1 shows one phase of the motor according to the invention, seen in perspective.

FIG. 1 shows a partial view of a phase 10 of the motor according to the invention. The phase 10 is also shown in cross section in a mid-plane P1 perpendicular to the axis of the rotor in FIG. 2. The phase comprises a magnetic circuit formed by the combination of a first module 11 and a second module 12. Each of the two E-shaped modules has three branches: a central branch (111, 121) and two lateral branches (112-113, 122-123). The two modules are arranged facing one another, the central branches being directed toward one another and each forming a stator pole, the diameter of the rotor being less than the length of the central branch.

Figure 2:
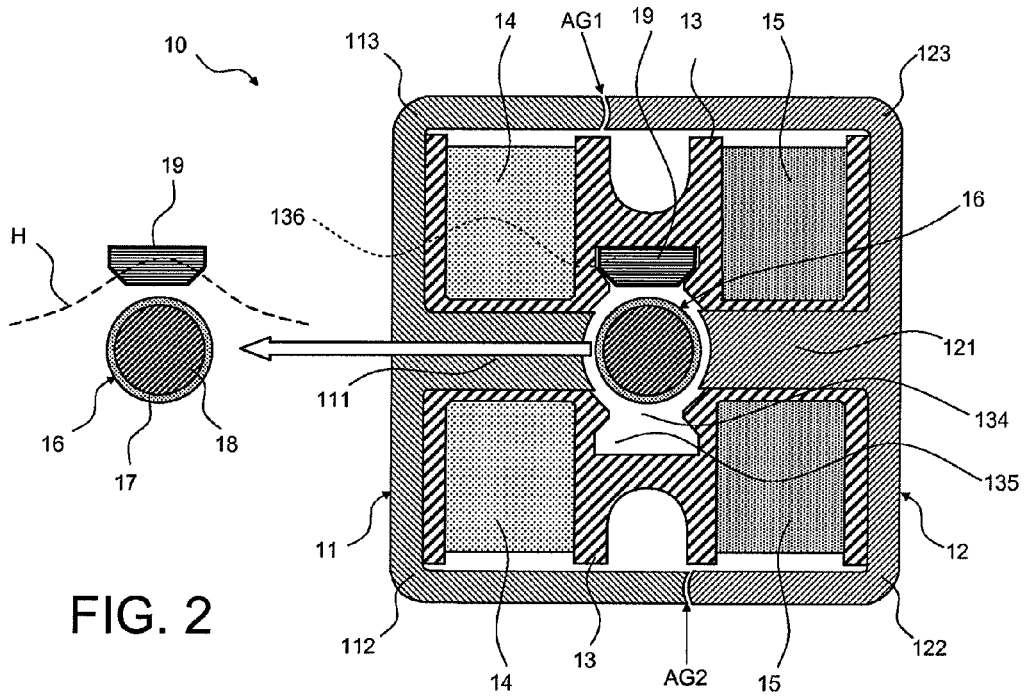
FIG. 2 shows a phase and the rotor of the motor in cross section in a mid-plane P1 perpendicular to the axis of the rotor.

For better visibility in FIG. 2, the first module 11 and the rotor 16 are not shown.

The phase also comprises a yoke frame 13 of one-piece type and non-deformable, made of insulating material. The term "non deformable" should be understood to mean "produced in such a way that windings can be produced on it without deformation that can be seen by the naked eye". The yoke frame serves as a support for a first winding 14 and for a second winding 15, the turns of which are situated in a mean plane parallel to the axis of the rotor 16 and perpendicular to the mid-plane. The two windings of one and the same phase are preferentially identical and passed through by one and the same current, it being understood from this that the windings are connected in series, or else that they are connected in parallel to one and the same power supply voltage. Preferentially, in order to have a magnetomotive force (number of ampere-turns) that is sufficient to create a strong magnetic induction in the region containing the rotor, the thickness of a winding (or at least the average of the thicknesses) is at least equal to the diameter of the rotor.

The yoke frame 13 comprises a central portion 131, a first lateral end lamination 132 and a second lateral end lamination 133. The central portion and each end lamination are connected by a yoke frame portion (not referenced) acting as the core for each winding.

The central portion is provided with a first through-recess 134, preferentially cylindrical, that is able to contain a rotor portion passing through the phase.

Besides its substantially cylindrical part, the first recess advantageously includes a first complementary section 135, and a second complementary section 136, arranged either side of the first recess, perpendicularly to the rotor and to the central branches 111 and 121 of the modules.

Each complementary section is of polygonal shape, formed by the superposition of a rectangle and a trapezoid with a base equal to the long dimension of the rectangle. A simply triangular, or trapezoidal, polygonal shape would also be suitable.

FIG. 2 also shows the rotor 16 in cross section. The rotor comprises a nonmagnetic tube 18, which ensures the rigidity of the rotor. In the active part of each phase, that is to say at least facing the central branches of the modules of the magnetic circuit and therefore in particular in the mid-plane, the rotor also comprises a magnetized material 17, for example a neodymium-iron-boron alloy. The nonmagnetic tube is made of stainless steel or brass. It may be grooved so as to limit the induced currents.

In the mid-plane, the yoke frame also supports a magnetic sensor 19, for example an induction winding or a Hall-effect sensor. This sensor is advantageously slipped into one of the complementary sections of the central recess: the dimensions of the sensor preferentially establishing those of the complementary sections. In order to use two different types of magnetic sensors, the complementary sections 135 and 136 can have different sections.

The sensor 19 is sensitive to a component of the flux normal to the plane of the sensor (in this case defined by the long dimension of the rectangle and perpendicular to the mid-plane). The magnetic field from one stator pole to the other stator pole, shown as the right of FIG. 1 by a single field line H drawn as a broken line, passes through the sensor in both directions, relative to this normal direction because of the perfect symmetry of the device relative to the mid-plane P1 (and to the plane perpendicular to the plane of the sensor). The result of this is that the sensor is insensitive to the field created by the stator, and it therefore translates only the field created by the stator. This structure therefore makes it possible to considerably simplify the sensing of rotor position information, without the need to use the tricks of the prior art. Obviously, the sensor can be slightly offset relative to the midplane, which nevertheless defines the optimum position of the latter if the device is perfectly symmetrical.

FIG. 1 shows the mid-plane P1, and the plot (broken line) of the mid-plane on the second module 12 of which only the lateral branch 123 can be seen. The plot of the mid-plane also appears on the first lateral end lamination 132. To be more precise, the mid-plane P1 of the phase is both perpendicular to the mean planes of the turns forming the windings and perpendicular to the axis of the rotor.

The yoke frame 13 is provided with a second through-recess 139, of rectangular section, used to house the central branch of the corresponding module.

The modules of the magnetic circuit can each be produced in a single piece (for example, using a sintered ferromagnetic powder) or else by assembling laminations.

FIG. 1 corresponds to the case of a one-piece production.

There are then 3 air gaps in a phase of the motor: the central air gap separating the central branches of each module and two air gaps, denoted AG1 and AG2, separating the lateral branches of the two modules. The presence of the air gaps AG1 and AG2 does not reduce the performance of the motor, inasmuch as their thickness is small compared to that of the central air gap.

The modules can also be produced by stacking laminations, each forming an E, either side of the mid-plane P1. It may be advantageous to alternate the mounting direction of the laminations so that they are interleaved or overlap in the lateral branches. The overlap is caused by the fact that a different length is given to each of the lateral branches of a lamination, one longer and one shorter than the length required to precisely cover a half-yoke frame.

Because of the overlapping of the laminations, all the air gaps of the lateral branches disappear, short-circuited by the overlap regions, even though the individual air gaps AG1 and AG2 remain between the laminations situated in one and the same plane.

Because of this, everything happens as if only the central air gap remained.

This interleaved arrangement contributes little to the performance of the motor (as indicated hereinabove, the role of the lateral air gaps is negligible), but can give the whole a better mechanical cohesion, and reduce the parasitic vibrations.

Figure 3:
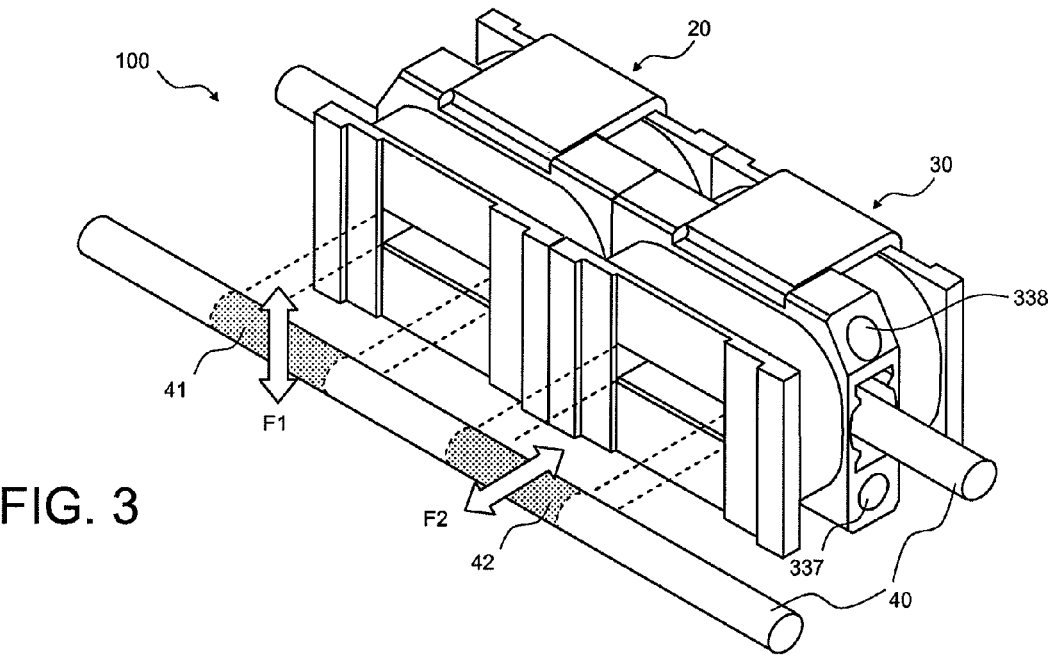
FIG. 3 shows a first embodiment of the motor, with two phases oriented in one and the same direction.

FIG. 3 shows a first motor 100 comprising two parallel phases referenced 20 and 30 and a cylindrical rotor 40. The whole is contained in a parallelepipedal casing, not shown, used in particular to secure the magnetic modules and supporting bearings or rolling bearings that guide the rotor. As in FIG. 1, the modules masking the second recess are not shown. The rotor 40 is shown in the first recess and also extracted from its housing, so as to identify the regions of the rotor that require magnetization.

As described in the prior art, there is at least one first magnetization region 41 and one second magnetization region 42, each corresponding to a phase portion. Preferentially, the magnetization region relating to each phase corresponds to the part of the rotor facing the stator poles. The two phases 20 and 30 are aligned, so the magnetization directions F1 and F2 of the two regions 41 and 42 must be perpendicular to one another.

The yoke frame 13 is provided with means of attachment to another yoke frame. These attachment means comprise, for example, holes 137 and 138 parallel to the axis of the rotor and formed in the central portion 131, as shown in FIG. 1.

FIG. 3 also shows the mutual attachment means for the two phases, symbolized by the through-holes 337 and 338. Screw and nut devices, not shown, are fitted into these holes to secure the two phases together.

Figure 4:
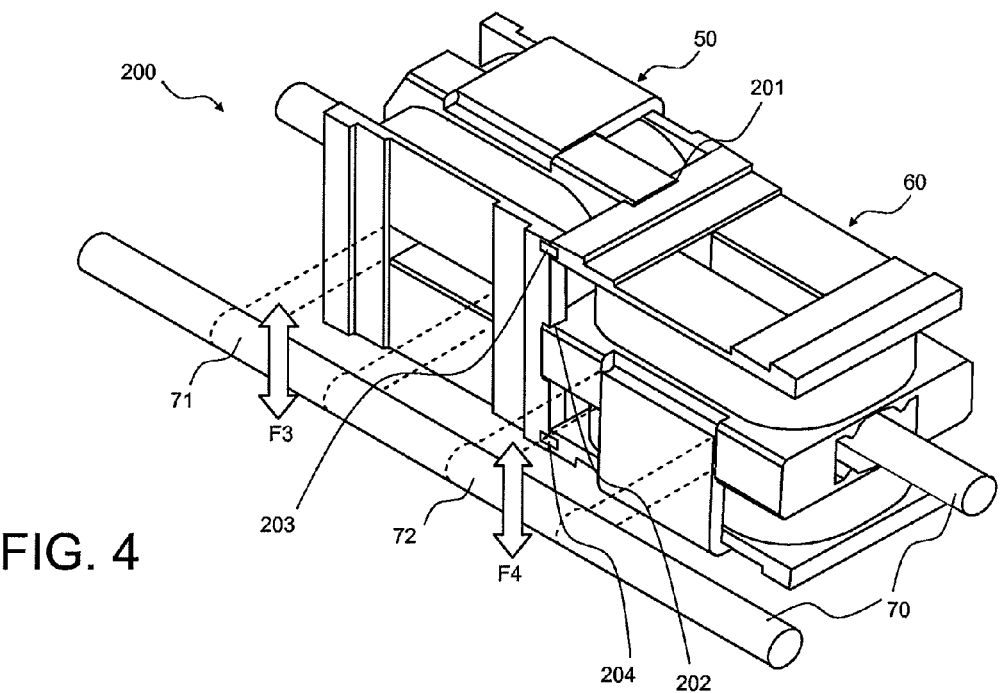
FIG. 4 shows a second embodiment of the motor, with two phases oriented in two perpendicular directions.

FIG. 4 shows, with the same conventions, a second motor 200 comprising two crossed phases referenced 50 and 60 and a cylindrical rotor 70. This time, the two magnetization regions 71 and 72 of the rotor are magnetized in directions F3 and F4 that are parallel to one another.

The mutual attachment means for the phases are different from the preceding case. Retaining notches 201 and 202 are used with which to lock each central portion in the lateral flanges of the other phase, and/or mutual snap-fitting means 203 and 204.

Such snap-fitting means can also be used in the case of FIG. 3.

It is also possible to ensure the alignment of the two phases (or their crossed positioning) by arranging them on a fitment allowing the hole to be rigidly overmolded.

In a variant of the rotors 40 and 70, the magnetized material continuously occupies the entire tube of the rotor, or at least the entire portion of the tube entering into the phases, and it is simply the magnetization operation that establishes the desired directions F1-F2 or F3-F4 in the magnetization regions.

The invention claimed is:

1. An electric motor for operating a window covering element in a building, comprising
   at least two phases and a magnetized rotor common to both phases, each phase being relative to a rotor portion in the direction of a rotor axis and comprising two windings,
   wherein each phase comprises an insulating yoke frame on which the two windings are produced and which has a central portion separating the windings, the central portion being provided with a first through-recess able to surround a rotor portion passing through the phase,
   wherein each phase comprises a magnetic circuit consisting essentially of:
   a first module and a second module arranged facing one another on the yoke frame, each module being in the form of an E with three branches, the central branch of a module forming a stator pole and a diameter of the rotor being less than a length of the central branch,
   wherein each module is formed by alternate laminations and wherein single air gap remains between modules once they have been assembled, the laminations being interleaved in two areas of overlap of the lateral branches of the two modules.

2. An electric motor for operating a window covering element in a building, comprising
   at least two phases and a magnetized rotor common to both phases, each phase being relative to a rotor portion in the direction of a rotor axis and comprising two windings,
   wherein each phase comprises an insulating yoke frame on which the two windings are produced and which has a central portion separating the windings, the central portion being provided with a first through-recess able to surround a rotor portion passing through the phase,
   wherein each phase comprises a magnetic circuit consisting essentially of:
   a first module and a second module arranged facing one another on the yoke frame, each module being in the form of E with three branches, the central branch of a module forming a stator pole and a diameter of the rotor being less than a length of the central branch,
   wherein each phase comprises at least one magnetic sensor that is activated by the rotor, this sensor being situated on a mid-plane of the phase, the windings being formed by turns having mean planes, the mid plane of the phase being perpendicular to the mean planes of the turns forming the windings and perpendicular to the axis of the rotor,
   wherein the first through-recess includes a first complementary section and a second complementary section arranged on either side of the first through-recess, the sensor fits into one of the complementary sections of the first through-recess, and the dimensions of the sensor establish those of the complementary sections.

3. The electric motor as claimed in claim 2, wherein each lateral branch of the first module and the second module at least partially covers one and the same winding, and wherein the central branch is fitted into a second recess in the yoke frame perpendicular to the first recess, and passes through the winding.

4. The electric motor as claimed in claim 3, wherein the second recess has a substantially rectangular section.

5. The electric motor as claimed in claim 2, wherein each module is in one piece and wherein three air gaps remain between the two modules once they have been assembled.

6. The electric motor as claimed in claim 2, wherein the first recess comprises a polygonal section to house the magnetic sensor.

7. The electric motor as claimed in claim 2, wherein the yoke frames comprise mutual attachment means.

8. The electric motor as claimed in claim 2, wherein the rotor comprises a nonmagnetic cylindrical tube housing a magnetized material at least in a part of the rotor intended to be surrounded by the at least two phases.

9. The electric motor as claimed in claim 2, wherein the average of the thicknesses of the windings of each of said at least two phases is at least equal to the diameter of the rotor.

10. The electric motor as claimed in claim 2, wherein the windings of each of said at least two phases are identical and are passed through by one and the same current.

11. An electric motor, comprising:
    at least two phases and a magnetized rotor common to both phases, each phase being relative to a rotor portion in the direction of a rotor axis and comprising two windings,
    wherein each phase comprises an insulating yoke frame on which the two windings are produced and which has a central portion separating the windings, the central portion being provided with a first through-recess able to surround a rotor portion passing through the phase,
    a first module and a second module arranged facing one another on the yoke frame, each module being in the form of an E with three branches,
    wherein a diameter of the rotor in the first through-recess is less than a length of the central branch,
    wherein the electric motor comprises a magnetic sensor fitted into a complementary section of the first through-recess, wherein the dimensions of the sensor establish those of the complementary section.

12. An electric motor for operating a window covering element in a building, comprising
    at least two phases and a magnetized rotor common to both phases, each phase being relative to a rotor portion in the direction of a rotor axis and comprising two windings,
    wherein each phase comprises an insulating yoke frame on which the two windings are produced and which has a central portion separating the windings, the central portion being provided with a first through-recess able to surround a rotor portion passing through the phase,
    wherein each phase comprises a magnetic circuit consisting essentially of a first module and a second module arranged facing one another on the yoke frame, each module being in the form of an E with three branches, the central branch of a module forming a stator pole, wherein each phase comprises at least one magnetic sensor that is activated by the rotor, this sensor being situated on a mid-plane of the phase, the windings being formed by turns having mean planes, the mid-plane of the phase being perpendicular to the mean planes of the turns forming the windings and perpendicular to the axis of the rotor, wherein the first through-recess includes a first complementary section and a second complementary section arranged on either side of the first through-recess, the sensor fits into one of the complementary sections of the first through-recess, and the dimensions of the sensor establish said one of the complementary sections.

* * * * *